US011230031B2

(12) United States Patent
Hand

(10) Patent No.: US 11,230,031 B2
(45) Date of Patent: *Jan. 25, 2022

(54) WOOD PARTICLE BOARDS

(71) Applicant: KNAUF INSULATION SPRL, Vise (BE)

(72) Inventor: Richard Hand, St. Helens-Merseyside (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,633

(22) Filed: Nov. 4, 2020

(65) Prior Publication Data

US 2021/0046669 A1 Feb. 18, 2021

Related U.S. Application Data

(63) Continuation of application No. 15/765,840, filed as application No. PCT/EP2016/074031 on Oct. 7, 2016, now Pat. No. 10,864,653.

(30) Foreign Application Priority Data

Oct. 9, 2015 (GB) ...................... 1517867

(51) Int. Cl.
*B27N 3/00* (2006.01)
*B27N 1/02* (2006.01)
*B27N 3/02* (2006.01)
*C08L 97/02* (2006.01)

(52) U.S. Cl.
CPC ........... *B27N 3/002* (2013.01); *B27N 1/0209* (2013.01); *B27N 3/02* (2013.01); *B27N 3/00* (2013.01); *C08L 97/02* (2013.01)

(58) Field of Classification Search
CPC .... B27N 1/0006; B27N 1/0209; B27N 3/002; B27N 3/08; B27N 7/00; C08G 73/02; C08L 97/00
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny et al. |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace et al. |
| 2,261,295 A | 11/1941 | Schlack |
| 2,362,086 A | 11/1944 | Eastes et al. |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd et al. |
| 3,222,243 A | 12/1965 | Gaston et al. |
| 3,231,349 A | 1/1966 | Stalego |
| 3,232,821 A | 2/1966 | Banks et al. |
| 3,297,419 A | 1/1967 | Eyre, Jr. |
| 3,513,001 A | 5/1970 | Woodhead et al. |
| 3,551,365 A | 12/1970 | Matalon |
| 3,784,408 A | 1/1974 | Jaffe et al. |
| 3,791,807 A | 2/1974 | Etzel et al. |
| 3,802,897 A | 4/1974 | Bovier et al. |
| 3,809,664 A | 5/1974 | Burr et al. |
| 3,826,767 A | 7/1974 | Hoover et al. |
| 3,856,606 A | 12/1974 | Fan et al. |
| 3,867,119 A | 2/1975 | Takeo et al. |
| 3,907,724 A | 9/1975 | Higginbottom |
| 3,911,048 A | 10/1975 | Nistri et al. |
| 3,919,134 A | 11/1975 | Higginbottom |
| 3,922,466 A | 11/1975 | Bell et al. |
| 3,955,031 A | 5/1976 | Jones et al. |
| 3,956,204 A | 5/1976 | Higginbottom |
| 3,961,081 A | 6/1976 | McKenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,109,057 A | 8/1978 | Nakamura et al. |
| 4,144,027 A | 3/1979 | Habib |

(Continued)

FOREIGN PATENT DOCUMENTS

| | | |
|---|---|---|
| AU | 8538765 | 8/1985 |
| AU | 9640921 | 7/1997 |

(Continued)

OTHER PUBLICATIONS

International Search Report and Written Opinion for PCT/US2008/059730, completed Sep. 22, 2008.
International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update,"Chemistry & Industry, No. 17, 1988, 4 pages.

(Continued)

*Primary Examiner* — Mary Lynn F Theisen
(74) *Attorney, Agent, or Firm* — Knauf Insulation, Inc.; James K. Blodgett; Brandon N. Hudder

(57) ABSTRACT

A non-carbohydrate polyhydroxy component(s) is used in a binder composition to facilitate manufacture of wood particle boards.

16 Claims, 1 Drawing Sheet

(56) References Cited

U.S. PATENT DOCUMENTS

| | | |
|---|---|---|
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,247 A | 5/1980 | Shannon |
| 4,201,857 A | 5/1980 | Krasnobajew et al. |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan et al. |
| 4,714,727 A | 12/1987 | Hume, III |
| 4,720,295 A | 1/1988 | Bronshtein |
| 4,734,996 A | 4/1988 | Kim et al. |
| 4,754,056 A | 6/1988 | Ansel et al. |
| 4,761,184 A | 8/1988 | Markessini |
| 4,780,339 A | 10/1988 | Lacourse et al. |
| 4,828,643 A | 5/1989 | Newman et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,918,861 A | 4/1990 | Carpenter et al. |
| 4,923,980 A | 5/1990 | Blomberg |
| 4,950,444 A | 8/1990 | Deboufie et al. |
| 4,988,780 A | 1/1991 | Das et al. |
| 4,992,519 A | 2/1991 | Mukherjee |
| 5,001,202 A | 3/1991 | Denis et al. |
| 5,013,405 A | 5/1991 | Izard |
| 5,032,431 A | 7/1991 | Conner et al. |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon et al. |
| 5,244,474 A | 9/1993 | Lorcks et al. |
| 5,278,222 A | 1/1994 | Stack |
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga et al. |
| 5,340,868 A | 8/1994 | Strauss et al. |
| 5,352,480 A | 10/1994 | Hansen et al. |
| 5,367,849 A | 11/1994 | Bullock |
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,470,843 A | 11/1995 | Stahl et al. |
| 5,480,973 A | 1/1996 | Goodlad et al. |
| 5,492,756 A | 2/1996 | Seale et al. |
| 5,498,662 A | 3/1996 | Tanaka et al. |
| 5,503,920 A | 4/1996 | Alkire et al. |
| 5,534,612 A | 7/1996 | Taylor et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,554,730 A | 9/1996 | Woiszwillo et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,660,904 A | 8/1997 | Andersen et al. |
| 5,661,213 A | 8/1997 | Arkens et al. |
| 5,670,585 A | 9/1997 | Taylor et al. |
| 5,672,418 A | 9/1997 | Hansen et al. |
| 5,672,659 A | 9/1997 | Shalaby et al. |
| 5,690,715 A | 11/1997 | Schiwek |
| 5,691,060 A | 11/1997 | Levy |
| 5,693,411 A | 12/1997 | Hansen et al. |
| 5,719,092 A | 2/1998 | Arrington |
| 5,719,228 A | 2/1998 | Taylor et al. |
| 5,733,624 A | 3/1998 | Syme et al. |
| 5,756,580 A | 5/1998 | Natori et al. |
| 5,763,524 A | 6/1998 | Arkens et al. |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |
| 5,916,503 A | 6/1999 | Rettenbacher |
| 5,919,528 A | 7/1999 | Huijs et al. |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,954,869 A | 9/1999 | Elfersy et al. |
| 5,977,224 A | 11/1999 | Cheung et al. |
| 5,977,232 A | 11/1999 | Arkens et al. |

(56) References Cited

U.S. PATENT DOCUMENTS

| | | |
|---|---|---|
| 5,981,719 A | 11/1999 | Woiszwillo et al. |
| 5,983,586 A | 11/1999 | Berdan, II et al. |
| 5,990,216 A | 11/1999 | Cai et al. |
| 5,993,709 A | 11/1999 | Bonomo et al. |
| 6,022,615 A | 2/2000 | Rettenbacher |
| 6,067,821 A | 5/2000 | Jackson et al. |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,133,347 A | 10/2000 | Vickers, Jr. et al. |
| 6,136,916 A | 10/2000 | Arkens et al. |
| 6,139,619 A | 10/2000 | Zaretskiy et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Anderson et al. |
| 6,194,512 B1 | 2/2001 | Chen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,281,298 B1 | 8/2001 | Papsin, Jr. |
| 6,299,677 B1 | 10/2001 | Johnson et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,379,814 B1 | 4/2002 | Dupre et al. |
| 6,395,856 B1 | 5/2002 | Petty et al. |
| 6,403,665 B1 | 6/2002 | Sieker et al. |
| 6,407,225 B1 | 6/2002 | Mang et al. |
| 6,410,036 B1 | 6/2002 | De Rosa et al. |
| 6,440,204 B1 | 8/2002 | Rogols et al. |
| 6,441,122 B1 | 8/2002 | DeMott et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,555,616 B1 | 4/2003 | Helbing et al. |
| 6,559,302 B1 | 5/2003 | Shah et al. |
| 6,562,267 B1 | 5/2003 | Hansen et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,706,853 B1 | 3/2004 | Stanssens et al. |
| 6,719,862 B2 | 4/2004 | Quick et al. |
| 6,730,730 B1 | 5/2004 | Hansen et al. |
| 6,753,361 B2 | 6/2004 | Kroner et al. |
| 6,818,694 B2 | 11/2004 | Hindi et al. |
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,680,224 B2 | 3/2014 | Zhang et al. |
| 8,691,934 B2 | 4/2014 | Helbing et al. |
| 8,900,495 B2 | 12/2014 | Pacorel et al. |
| 10,864,653 B2 * | 12/2020 | Hand ............... B27N 3/02 |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |
| 2003/0148084 A1 | 8/2003 | Trocino |
| 2003/0153690 A1 | 8/2003 | Husemoen et al. |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |

(56) References Cited

U.S. PATENT DOCUMENTS

| | | |
|---|---|---|
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0017394 A1 | 1/2005 | Hochsmann et al. |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0039520 A1 | 2/2007 | Crews et al. |
| 2007/0082983 A1 | 4/2007 | Crews et al. |
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Hamed |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0301972 A1 | 12/2009 | Hines et al. |
| 2009/0304919 A1 | 12/2009 | Huenig et al. |
| 2009/0306255 A1 | 12/2009 | Patel et al. |
| 2009/0324915 A1 | 12/2009 | Swift et al. |
| 2010/0029160 A1 | 2/2010 | Srinivasan et al. |
| 2010/0058661 A1 | 3/2010 | Jackson et al. |
| 2010/0080976 A1 | 4/2010 | Jackson et al. |
| 2010/0084598 A1 | 4/2010 | Jackson et al. |
| 2010/0086726 A1 | 4/2010 | Jackson et al. |
| 2010/0087571 A1 | 4/2010 | Jackson et al. |
| 2010/0098947 A1 | 4/2010 | Inoue et al. |
| 2010/0117023 A1 | 5/2010 | Dopico et al. |
| 2010/0129640 A1 | 5/2010 | Kelly |
| 2010/0130649 A1 | 5/2010 | Swift et al. |
| 2010/0175826 A1 | 7/2010 | Huenig et al. |
| 2010/0210595 A1 | 8/2010 | Wagner et al. |
| 2010/0222463 A1 | 9/2010 | Brady et al. |
| 2010/0222566 A1 | 9/2010 | Fosdick et al. |
| 2010/0282996 A1 | 11/2010 | Jaffrennou et al. |
| 2010/0301256 A1 | 12/2010 | Hampson et al. |
| 2010/0320113 A1 | 12/2010 | Swift |
| 2011/0021672 A1 | 1/2011 | Crews et al. |
| 2011/0039111 A1 | 2/2011 | Shooshtari |
| 2011/0040010 A1 | 2/2011 | Shooshtari |
| 2011/0042303 A1 | 2/2011 | Shooshtari et al. |
| 2011/0045966 A1 | 2/2011 | Shooshtari et al. |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0256790 A1 | 10/2011 | Toas et al. |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2011/0306726 A1 | 12/2011 | Bailey et al. |
| 2012/0133073 A1 | 5/2012 | Pacorel et al. |
| 2012/0156954 A1 | 6/2012 | Eckert et al. |
| 2013/0029150 A1 | 1/2013 | Appley et al. |
| 2013/0032749 A1 | 2/2013 | Jaffrennou et al. |
| 2013/0047888 A1 | 2/2013 | Mueller et al. |
| 2013/0059075 A1 | 3/2013 | Appley et al. |
| 2013/0082205 A1 | 4/2013 | Mueller et al. |
| 2013/0174758 A1 | 7/2013 | Mueller |
| 2013/0234362 A1 | 9/2013 | Swift et al. |
| 2013/0236650 A1 | 9/2013 | Swift et al. |
| 2013/0237113 A1 | 9/2013 | Swift et al. |
| 2013/0244524 A1 | 9/2013 | Swift et al. |
| 2014/0091247 A1 | 4/2014 | Jackson et al. |
| 2014/0134909 A1 | 5/2014 | Guo et al. |
| 2014/0357787 A1 | 12/2014 | Jobber et al. |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0375235 A1 | 6/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |

(56) References Cited

FOREIGN PATENT DOCUMENTS

| | | |
|---|---|---|
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |
| WO | WO-2014027115 A1 * | 2/2014 ........... B27N 1/0209 |

OTHER PUBLICATIONS

"Gamma-aminopropyltrimethoxysilane,"Hawley'S Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Residential Energy Conservation: vol. 1, Congress of the U.S., Office of Technology Assessment (Ed.), 357 pages (Jan. 1, 1979).
Office action for co-pending US Appl. No. 12/524,502 (9 pages)—dated Sep. 21, 2012.
Office action for co-pending US Appl. No. 12/524,502 (9 pages)—dated Apr. 4, 2013.
Office action for co-pending US Appl. No. 12/524,512 (7 pages)—dated Aug. 6, 2012.
Office action for co-pending US Appl. No. 12/524,512 (9 pages)—dated Apr. 1, 2013.
Office action for co-pending US Appl. No. 12/524,512 (14 pages)—dated Nov. 12, 2014.
Office action for co-pending US Appl. No. 12/524,512 (9 pages)—dated Jul. 10, 2015.
Office action for co-pending US Appl. No. 12/524,512 (10 pages)—dated Mar. 23, 2016.

(56) References Cited

OTHER PUBLICATIONS

Office action for co-pending US Appl. No. 12/524,512 (13 pages)—dated Oct. 5, 2016.
Office action for co-pending US Appl. No. 12/524,512 (13 pages)—dated Apr. 6, 2018.
Office action for co-pending US Appl. No. 12/524,512 (15 pages)—dated Jan. 17, 2019.
Office action for co-pending US Appl. No. 12/524,469 (7 pages)—dated Jun. 7, 2012.
Office action for co-pending US Appl. No. 12/524,469 (8 pages)—dated Jan. 29, 2013.
Office action for co-pending US Appl. No. 12/524,469 (7 pages)—dated Aug. 20, 2013.
Office action for co-pending US Appl. No. 12/524,469 (9 pages)—dated Jun. 9, 2014.
Office action for co-pending US Appl. No. 12/524,469 (9 pages)—dated Oct. 17, 2014.
Office action for co-pending US Appl. No. 12/524,469 (9 pages)—dated Jul. 23, 2015.
Office action for co-pending US Appl. No. 12/524,539 (13 pages)—dated Jun. 21, 2012.
Office action for co-pending US Appl. No. 12/524,539 (13 pages)—dated Jun. 6, 2013.
Office action for co-pending US Appl. No. 12/524,539 (12 pages)—dated Dec. 17, 2014.
Office action for co-pending US Appl. No. 12/524,539 (7 pages)—dated Jul. 15, 2015.
Office action for co-pending US Appl. No. 12/524,539 (7 pages)—dated Mar. 23, 2016.
Office action for co-pending US Appl. No. 12/524,539 (7 pages)—dated Dec. 29, 2016.
Office action for co-pending US Appl. No. 12/524,522 (4 pages)—dated Oct. 11, 2011.
Office action for co-pending US Appl. No. 12/667,718 (5 pages)—dated Sep. 3, 2013.
Office action for co-pending US Appl. No. 12/667,718 (6 pages)—dated Sep. 9, 2014.
Office action for co-pending US Appl. No. 12/671,922 (10 pages)—dated Oct. 7, 2011.
Office action for co-pending US Appl. No. 12/671,922 (10 pages)—dated May 10, 2012.
Office action for co-pending US Appl. No. 12/671,922 (9 pages)—dated Sep. 23, 2014.
Office action for co-pending US Appl. No. 12/671,922 (5 pages)—dated Apr. 4, 2016.
Office action for co-pending US Appl. No. 13/388,408 (5 pages)—dated Aug. 15, 2013.
Office action for co-pending US Appl. No. 13/371,829 (9 pages)—dated Dec. 20, 2012.
Office action for co-pending US Appl. No. 13/371,829 (6 pages)—dated Jul. 12, 2013.
Office action for co-pending US Appl. No. 13/371,829 (6 pages)—dated Aug. 12, 2014.
Office action for co-pending US Appl. No. 13/637,794 (8 pages)—dated Aug. 12, 2013.
Office action for co-pending US Appl. No. 13/637,794 (9 pages)—dated Mar. 26, 2014.
Office action for co-pending US Appl. No. 13/696,439 (11 pages)—dated Jan. 8, 2014.
Office action for co-pending US Appl. No. 13/696,452 (7 pages)—dated Jan. 13, 2015.
Office action for co-pending US Appl. No. 13/696,452 (9 pages)—dated Oct. 27, 2015.
Office action for co-pending US Appl. No. 13/702,144 (6 pages)—dated Jan. 10, 2014.
Office action for co-pending US Appl. No. 13/702,144 (7 pages)—dated Jul. 29, 2014.
Office action for co-pending US Appl. No. 13/823,818 (9 pages)—dated Mar. 26, 2015.
Office action for co-pending US Appl. No. 13/866,368 (16 pages)—dated Aug. 29, 2013.
Office action for co-pending US Appl. No. 13/866,368 (11 pages)—dated Apr. 16, 2014.
Office action for co-pending US Appl. No. 13/866,368 (8 pages)—dated Aug. 21, 2014.
Office action for co-pending US Appl. No. 13/866,419 (14 pages)—dated Sep. 20, 2013.
Office action for co-pending US Appl. No. 13/866,419 (10 pages)—dated Apr. 25, 2014.
Office action for co-pending US Appl. No. 13/866,419 (8 pages)—dated Oct. 9, 2014.
Office action for co-pending US Appl. No. 13/866,419 (8 pages)—dated Sep. 25, 2015.
Office action for co-pending US Appl. No. 13/868,233 (23 pages)—dated Aug. 13, 2013.
Office action for co-pending US Appl. No. 13/868,233 (12 pages)—dated Apr. 15, 2014.
Office action for co-pending US Appl. No. 13/868,233 (8 pages)—dated Oct. 7, 2014.
Office action for co-pending US Appl. No. 13/868,233 (8 pages)—dated Jul. 16, 2015.
Office action for co-pending US Appl. No. 13/868,238 (8 pages)—dated Jul. 16, 2014.
Office action for co-pending US Appl. No. 12/976,379 (7 pages)—dated Jan. 10, 2012.
Office action for co-pending US Appl. No. 12/976,379 (6 pages)—dated Jul. 27, 2012.
Office action for co-pending US Appl. No. 12/976,379 (9 pages)—dated Mar. 7, 2013.
Office action for co-pending US Appl. No. 12/976,379 (8 pages)—dated Aug. 20, 2013.
Office action for co-pending US Appl. No. 12/599,858 (8 pages)—dated May 11, 2011.
Office action for co-pending US Appl. No. 13/341,542 (8 pages)—dated Dec. 26, 2012.
Office action for co-pending US Appl. No. 13/341,542 (7 pages)—dated Feb. 10, 2014.
Office action for co-pending US Appl. No. 14/026,394 (6 pages)—dated Aug. 14, 2014.
Office action for co-pending US Appl. No. 14/272,556 (14 pages)—dated Nov. 20, 2014.
Office action for co-pending US Appl. No. 14/272,556 (12 pages)—dated Sep. 17, 2015.
Office action for co-pending US Appl. No. 14/342,069 (17 pages)—dated Dec. 29, 2015.
Office action for co-pending US Appl. No. 14/342,069 (22 pages)—dated Sep. 2, 2016.
Office action for co-pending US Appl. No. 14/342,069 (21 pages)—dated Sep. 26, 2017.
Office action for co-pending US Appl. No. 14/342,069 (21 pages)—dated Jun. 6, 2018.
Office action for co-pending US Appl. No. 14/649,277 (9 pages)—dated Jul. 22, 2016.
Office action for co-pending US Appl. No. 14/686,915 (8 pages)—dated Nov. 18, 2016.
Office action for co-pending US Appl. No. 14/810,765 (7 pages)—dated Jan. 29, 2016.
Office action for co-pending US Appl. No. 14/828,916 (8 pages)—dated Nov. 25, 2016.
Office action for co-pending US Appl. No. 14/867,502 (9 pages)—dated Nov. 18, 2016.
Office action for co-pending US Appl. No. 15/172,432 (16 pages)—dated Apr. 17, 2017.
Office action for co-pending US Appl. No. 15/702,087 (5 pages)—dated Nov. 9, 2018.
Office action for co-pending US Appl. No. 15/177,442 (17 pages)—dated May 19, 2017.
Office action for co-pending US Appl. No. 15/378,159 (18 pages)—dated Mar. 2, 2017.
Office action for co-pending US Appl. No. 15/222,122 (8 pages)—dated Nov. 20, 2017.

(56) References Cited

OTHER PUBLICATIONS

Office action for co-pending US Appl. No. 15/310,837 (13 pages)—dated Jun. 21, 2018.
Office action for co-pending US Appl. No. 15/411,972 (9 pages)—dated Mar. 28, 2017.
Office action for co-pending US Appl. No. 15/411,972 (8 pages)—dated Nov. 29, 2017.
Office action for co-pending US Appl. No. 15/411,972 (9 pages)—dated Jun. 14, 2018.
Office action for co-pending US Appl. No. 15/116,254 (8 pages)—dated Apr. 26, 2018.
Office action for co-pending US Appl. No. 15/116,254 (10 pages)—dated Aug. 15, 2018.
Office action for co-pending US Appl. No. 15/333,670 (5 pages)—dated Dec. 8, 2017.
Office Action for co-pending US Appl. No. 14/116,048 (10 pages)—dated Jun. 23, 2017.
Office action for co-pending US Appl. No. 15/959,131 (8 pages)—dated Nov. 8, 2019.
Office action for co-pending US Appl. No. 15/822,102 (6 pages)—dated Dec. 6, 2019.
Office action for co-pending US Appl. No. 15/690,623 (6 pages)—dated Jan. 9, 2020.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Patent No. D. 631,670 (68 pages, filed Jun. 19, 2015 by Petitioners Johns Manville Corporation and Johns Manville, Inc.).
2nd Petition for Inter Partes Review of U.S. Patent No. D. 631,670 (62 pages, filed Nov. 2, 2015 by Petitioners Johns Manville Corporation and Johns Manville, Inc.).
Decision of PTAB regarding Institution of Inter Partes Review for U.S. Patent No. D. 631,670 (33 pages)—Jan. 12, 2016.
Decision2 of PTAB regarding Institution of Inter Partes Review for U.S. Patent No. D. 631,670 (27 pages)—May 9, 2016.
Final Written Decision of PTAB regarding Inter Partes Review of D. 631,670 based on 1st Petition (56 pages)—Jan. 11, 2017.
Final Written Decision of PTAB regarding Inter Partes Review of D. 631,670 based on 2nd Petition (55 pages)—May 8, 2017.
Court of Appeals for Federal Circuit Judgment from Appeal of PTAB Decisions in Inter Partes Reviews of U.S. Patent No. D. 631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, dated Dec. 24, 2013, in Control No. 90/013,029, 11 pages.
Office Action Granting Ex Parte Reexamination of U.S. Pat. No. 7,772,347, dated Dec. 24, 2013, in Control No. 90/013,030, 14 pages.
Office Action Granting Ex Parte Reexamination of U.S. Pat. No. 7,854,980, dated Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Final Rejection in Ex Parte Reexamination of U.S. Pat. No. 7,888,445 (20 pages)—dated Jul. 24, 2015.
Final Rejection in Ex Parte Reexamination of U.S. Pat. No. 7,772,347 (23 pages)—dated Jul. 24, 2015.
Final Rejection in Ex Parte Reexamination of U.S. Pat. No. 7,854,980 (31 pages)—dated Aug. 18, 2015.
Advisory Action in Ex Parte Reexamination of U.S. Pat. No. 7,888,445 (4 pages)—dated Oct. 6, 2015.
Advisory Action in Ex Parte Reexamination of U.S. Pat. No. 7,772,347 (4 pages)—dated Oct. 6, 2015.
Advisory Action in Ex Parte Reexamination of U.S. Pat. No. 7,854,980 (4 pages)—dated Nov. 18, 2015.

(56) References Cited

OTHER PUBLICATIONS

Examiner's Answer in Ex Parte Reexamination of U.S. Pat. No. 7,888,445 (8 pages)—dated Mar. 23, 2016.
Examiner's Answer in Ex Parte Reexamination of U.S. Pat. No. 7,772,347 (8 pages)—dated Mar. 23, 2016.
Examiner's Answer in Ex Parte Reexamination of U.S. Pat. No. 7,854,980 (8 pages)—dated Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Notice of Intent to Issue Inter Partes Reexamination Certificate for U.S. Pat. No. 7,888,445 (14 pages)—Sep. 24, 2020.
Notice of Intent to Issue Inter Partes Reexamination Certificate for U.S. Pat. No. 7,772,347 (13 pages)—Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—dated Apr. 3, 2019.
Final Office Action from Reopened Prosecution in Ex Parte Reexamination of U.S. Pat. No. 7,854,980 (11 pages)—dated Aug. 8, 2019.
Notice of Intent to Issue Ex Parte Reexamination Certificate for U.S. Pat. No. 7,854,980 (3 pages)—Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—dated Oct. 17, 2016.
Examiner's Determination on Patent Owner Response/Requester Comments after Board Decision in Inter Partes Reexamination of U.S. Pat. No. 7,772,347 (17 pages)—dated Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.
Decision of USPTO Granting Ex Parte Re-exam of U.S. Pat. No. 9,464,207 (19 pages)—Aug. 27, 2021.
Decision of USPTO Granting Ex Parte Re-exam of U.S. Pat. No. 9,926,464 (16 pages)—Sep. 7, 2021.
Decision of USPTO Granting Ex Parte Re-exam of U.S. Pat. No. 9,469,747 (10 pages)—Sep. 16, 2021.
Notice of Intent to Issue Ex Parte Reexamination Certificate for U.S. Pat. No. 8,114,210 (4 pages)—May 27, 2021.
Notice of Intent to Issue Ex Parte Reexamination Certificate for U.S. Pat. No. 9,464,207 (4 pages)—Apr. 19, 2021.
Notice of Intent to Issue Ex Parte Reexamination Certificate for U.S. Pat. No. 9,828,287 (5 pages)—May 5, 2021.
Notice of Intent to Issue Ex Parte Reexamination Certificate for U.S. Pat. No. 9,926,464 (5 pages)—May 5, 2021.
Notice of Intent to Issue Ex Parte Reexamination Certificate for U.S. Pat. No. 9,469,747 (8 pages)—May 21, 2021.
Notice of Intent to Issue Ex Parte Reexamination Certificate for U.S. Pat. No. 9,039,827 (3 pages)—Jul. 2, 2021.
Notice of Intent to Issue Ex Parte Reexamination Certificate for U.S. Pat. No. 8,940,089 (4 pages)—Jul. 13, 2021.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
Expert Report re Revocation of GB2451719 and GB2496951—Claimant Rockwool International (Nov. 12, 2018, 11 pages).

(56) References Cited

OTHER PUBLICATIONS

United Kingdom Intellectual Property Office, Decision in *Rockwool International* v. *Knauf Insulation Limited*, Application under Section 72 for revocation of patents GB2451719 and GB2496951 (May 28, 2019—18 pages).
Decision of EPO Board of Appeal re Added Matter vis-a-vis EP06788492.4 (Jul. 17, 2019—14 pages).
U.S. Pat. No. 2,965,504.
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).

* cited by examiner

WOOD PARTICLE BOARDS

CROSS-REFERENCE TO RELATED APPLICATIONS

This application is a continuation application of U.S. application Ser. No. 15/765,840, filed Apr. 4, 2018, which is a 35 U.S.C. § 371 national counterpart application of WIPO PCT Application No. PCT/EP2016/074031, filed Oct. 7, 2016, which claims priority to GB Application Serial No. 1517867.6, filed Oct. 9, 2015, the disclosures of which are incorporated herein by reference.

The present invention relates to wood particle boards and a method for their production.

A wood particle board is a composite material manufactured from wood particles, for example wood chips, sawmill shavings and/or saw dust at varying particle sizes held together by a binder and used especially for the manufacture of furniture, such as cabinets, kitchens and bathroom furniture. Generally, wood particle board (which is sometimes referred to as "chipboard") is produced by mixing wood particles and a binder composition, e.g. a thermo-curable resin, subsequently forming the resulting mixture into a sheet or mat and compressing said sheet or mat under elevated temperatures. In order to improve the visual appearance and/or durability, a veneer or melamine layer may be applied to the board's surface(s).

According to one aspect, the present invention provides a method of manufacturing a wood particle board as defined in claim 1. The dependent claims define preferred or alternative embodiments.

The presence of the non-carbohydrate polyhydroxy component of the binder composition may be useful to i) facilitate an even distribution of the binder composition over individual wood particles and/or over a collection of wood particles which are mixed or processed together and/or ii) provide an appropriate quantity of moisture for the resinated wood particles. A binder composition that cannot easily flow or be distributed may lead to clumping of resinated wood particles and/or to a non-homogenous material mix at entry into board press. The non-carbohydrate polyhydroxy component may act as a lubricant and/or a non-drying liquid; this may reduce or prevent clumping of the resinated wood particles.

The resinated wood particles may be mixed or tumbled, for example in a bunker, prior to being formed in to a mat; the non-carbohydrate polyhydroxy component may facilitate binder distribution over surfaces of the wood particles during such mixing. Furthermore, the use of a non-carbohydrate polyhydroxy component may avoid the necessity of providing additional water or diluting the binder composition to facilitate binder distribution and thus avoid the generation of undesired quantities of steam during subsequent curing.

The non-carbohydrate polyhydroxy component may be selected from: a diol, a triol, a polyol, an organic compound containing multiple hydroxyl groups and mixtures thereof. It may comprise, comprise at least 50 wt % or consist essentially of glycerol, polyethylene glycol, polypropylene glycol, trimethylolpropane, pentaerythritol, polyvinyl alcohol, partially hydrolyzed polyvinyl acetate, fully hydrolyzed polyvinyl acetate, or mixtures thereof. Glycerol is particularly preferred because it can be acquired as a cost efficient waste product from other industrial processes, is bio based and is non-hazardous chemical.

The non-carbohydrate polyhydroxy component may have a viscosity when measured at 20° C. which is: —greater than or equal to: 10 cP, 50 cP, 100 cP or 250 cP or 500 cP or 750 cP or 1000 cP or 1250 cP; and/or—less than or equal to: 10000 cP or 7500 cP or 5000 cP or 2500 or 2000 cP or 1500 cP; notably when the viscosity is measured at 20° C. The viscosity of the non-carbohydrate polyhydroxy component and of the binder composition is measured by rotational viscometry notably using a Brookfield viscometer. One such viscosity measurement involves applying a torque through a calibrated spring to a spindle immersed in a test fluid, the amount of viscous drag indicated by the spring deflection providing a measure of the viscosity.

The non-carbohydrate polyhydroxy component may be used in a quantity of: —at least 0.1% or at least 1%, or at least 2% or at least 5% and/or—no more than 25% or no more than 20% or no more than 15% by weight based on the total weight of the binder composition.

The term "binder composition" as used herein means all ingredients applied to the wood particles and/or present on the wood particles, notably prior to curing, (other than the wood particles themselves and any moisture in the wood particles), including reactants, solvents (including water), the non-carbohydrate polyhydroxy component(s) and additives. The term "dry weight of the binder composition" as used herein means the weight of all components of the binder composition other than any water that is present (whether in the form of liquid water or in the form of water of crystallization).

The binder composition applied to the wood particles comprises uncured reactants which cure and cross-link to form a cured binder which holds the particles of the wood particle board together. The binder composition comprises starting materials that will form a thermoset resin upon curing. The reactants may comprise components selected from the group consisting of: protein(s), starch(es), cellulose, carbohydrate(s), gum(s), natural resin(s), bitumen(s), natural rubber(s), synthetic rubber(s), phenolic(s) such as tannin or lignin, notably present in a quantity of at least 30%, at least 40%, at least 50%, at least 60%, at least 70% or at least 80% by dry weight based on the total dry weight of the binder composition.

The binder composition is preferably free of, or comprises no more than 5 wt % or no more than 10 wt % urea formaldehyde (UF), melamine urea formaldehyde (MUF) and/or phenol formaldehyde.

The binder composition is preferably a binder that does not comprise any added formaldehyde. It may be "substantially formaldehyde free", that is to say that it liberates less than 5 ppm formaldehyde as a result of drying and/or curing (or appropriate tests simulating drying and/or curing); more preferably it is "formaldehyde free", that is to say that it liberates less than 1 ppm formaldehyde in such conditions.

Advantageously, the binder composition may be a carbohydrate based binder composition. The combination of this with the non-carbohydrate polyhydroxy component(s) has been found to provide an advantageous combination of bond strength, notably without penalizing cure speed, whilst facilitating manufacturing processes. The binder composition may comprise (a) reducing sugar reactant(s) and nitrogen-containing reactant(s) and/or (b) curable reaction product(s) of reducing sugar reactant(s) and nitrogen-containing reactant(s). The reducing sugar reactants may be provided in the form of reducing sugars and/or generated in situ, notably from a carbohydrate reactant which yields reducing sugar(s) in situ, for example due to application of heat and/or presence of a catalyst or further reactant.

The binder composition may comprise a binder composition as described in any of WO 2007/014236, WO 2009/

019232, WO 2009/019235, WO 2011/138458, WO 2011/138459 or WO 2013/150123, each of which is hereby incorporated by reference.

The nitrogen-containing reactant(s) and the reducing sugar reactant(s) (or their reaction product(s)) may be Maillard reactants that react to form Maillard reaction products, notably melanoidins when cured. Curing of the binder composition may comprise or consist essentially of Maillard reaction(s). The cured binder composition may comprise melanoidin-containing and/or nitrogenous-containing polymer(s); it is preferably a thermoset binder and is preferably substantially water insoluble.

The reducing sugar reactant may comprise: a monosaccharide, a monosaccharide in its aldose or ketose form, a disaccharide, a polysaccharide, a triose, a tetrose, a pentose, xylose, an hexose, dextrose, fructose, a heptose, a sugar, molasses, starch, starch hydrolysate, cellulose hydrolysates, reaction product(s) thereof or mixtures thereof. The reducing sugar reactant(s), or carbohydrate reactant(s) that yield the reducing sugar reactant(s) may have a dextrose equivalent of at least about 50, at least about 60, at least about 70, at least about 80 or at least about 90. The reducing sugar reactant may comprise or consist of high fructose corn syrup (HFCS).

As used herein, the term "nitrogen-containing reactant" means any chemical compound, or mixture of compounds, which contain(s) at least one nitrogen atom and which is/are capable of reacting with the at least one reducing sugar reactant. The nitrogen-containing reactant may be selected from $NH_3$, an inorganic amine or an organic amine comprising at least one primary amine group, as well as salts thereof. It may comprise $NH_3$ used as such (e.g. in form of an aqueous solution), or an inorganic and organic ammonium salt, for example ammonium sulfate ($AmSO_4$), ammonium phosphate, e.g. diammonium phosphate, ammonium chloride, ammonium nitrate or ammonium citrate.

The nitrogen-containing reactant may be a polyamine Herein, the term "polyamine" includes any organic compound having two or more amine groups, which may independently be substituted or unsubstituted. For example, the polyamine may be a primary polyamine. As used herein, a "primary polyamine" is an organic compound having two or more primary amine groups ($—NH_2$). Within the scope of the term primary polyamine are those compounds which can be modified in situ or isomerize to generate a compound having two or more primary amine groups ($—NH_2$). The primary polyamine may be a molecule having the formula $H_2N$-Q-$NH_2$, wherein Q is an alkanediyl, cycloalkanediyl, heteroalkanediyl, or cycloheteroalkanediyl, each of which may be optionally substituted. For example, Q may be an alkanediyl group selected from $—C_2$-$C_{24}—$, an alkanediyl group selected from $—C_2$-$C_9—$, or an alkanediyl group selected from $—C_3$-$C_7$-. According to a preferred embodiment, Q is a $C_6$ alkanediyl. According to another embodiment, Q may be a cyclohexanediyl, cyclopentanediyl or cyclobutanediyl, or a divalent benzyl radical. In this context, it should be noted that certain authors prefer using the term "alkyl" instead of the chemically more correct "alkanediyl" nomenclature; the same chemical group is meant.

As used herein, the term "alkanediyl" means a chain of carbon atoms, which may optionally be branched, preferably of limited length, including $—C_1$-$C_{24}$-, $—C_1$-$C_{12}$-, $—C_1$-$C_8$-, $—C_1$-$C_6—$, and $—C_1$-$C_4$-. Shorter alkanediyl groups may add less lipophilicity to the compound and accordingly will have different reactivity towards the reducing sugar reactant and/or solubility.

As used herein, the term "cycloalkanediyl" means a chain of carbon atoms, which may optionally be branched, where at least a portion of the chain is cyclic and also includes polycyclic structures, for example, cyclopropanediyl, cyclopentanediyl, cyclohexanediyl, 2-methylcyclopropanediyl, 2-ethylcyclopentanediyl, adamantanediyl. Furthermore, the chain forming cycloalkanediyl is advantageously of limited length, including $—C_3$-$C_{24}$-, $—C_3$-$C_{12}$-, $—C_3$-$C_8$-, $—C_3$-$C_6$-, and $—C_5$-$C_6$-. Shorter alkanediyl chains forming cycloalkanediyl may add less lipophilicity to the compound and accordingly will have a different behavior.

As used herein, the term "heteroalkanediyl" means a chain of atoms that includes both carbon and at least one heteroatom, and is optionally branched. Examples of such heteroatoms include nitrogen, oxygen, and sulfur. In certain variations, said hetero-atoms also include phosphorus, and selenium. In one embodiment, the heteroalkanediyl is a polyether. As used herein, the term "cycloheteroalkanediyl", includes a chain of atoms that includes both carbon and at least one heteroatom, such as heteroalkanediyl, and may optionally be branched, where at least a portion of the chain is cyclic. Particularly, examples of cycloheteroalkanediyl include divalent tetrahydrofuryl, pyrrolidinyl, tetrahydropyranyl, piperidinyl, morpholinyl, piperazinyl, homopiperazinyl, quinuclidinyl.

Herein, the term "optionally substituted" means the replacement of one or more hydrogen atoms with other functional groups. Such other functional groups may include amino, hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof.

The primary polyamine may be a diamine, triamine, tetramine, or pentamine, for example: a triamine selected from a diethylenetriamine, 1-piperazineethaneamine, or bis (hexamethylene)triamine; triethylenetetramine; or tetraethylenepentamine.

One feature of the primary polyamine is that it may possess low steric hindrance. For example, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazine-ethaneamine, 2-methyl-pentamethylenediamine, 1,3-pentanediamine, and bis(hexamethylene)triamine, as well as 1,8-diaminooctane have low steric hindrance.

Preferably, the nitrogen-containing reactant comprises or consists of 1,6-diaminohexane (hexamethylenediamine, HMDA) or 1,5-diamino-2-methylpentane (2-methyl-pentamethylenediamine).

In another embodiment, the nitrogen-containing reactant comprises or consists of a polyether-polyamine, which may be a diamine or a triamine, for example a trifunctional primary amine having an average molecular weight of 440 known as Jeffamine T-403 Polyetheramine (e.g. Huntsman Corporation).

In a further embodiment, the nitrogen-containing reactant may comprise or consist of a polymeric polyamine, for example chitosan, polylysine, polyethylene imine, poly(N-vinyl-N-methyl amine), polyaminostyrene, polyvinyl amine (which can be a homopolymer or a copolymer).

The reducing sugar reactant(s), may make up: —at least 30%, preferably at least 40%, preferably at least 50%, more preferably at least 60%, more preferably at least 70%, even more preferably at least 80% by dry weight of the binder composition; and/or—less than 97%, more preferably less than 95% by dry weight of the binder composition.

The nitrogen-containing reactant(s) may make up: —less than 50% or 40%, preferably less than 30%, more preferably less than 25% by dry weight of the binder composition; and/or—at least 2.5%, preferably at least 5%, more preferably at least 10% by dry weight of the binder composition.

The binder composition may comprise (i) at least 25%, and preferably at least 40%, at least 50% or at least 60% by dry weight of: (a) reducing sugar reactant(s) and nitrogen-containing reactant(s) and/or (b) curable reaction product(s) of reducing sugar reactant(s) and nitrogen-containing reactant(s).

The ratio of carbonyl groups in the reducing sugar reactant(s) to reactive amino groups in the nitrogen-containing reactant(s) may be in the range of 5:1 to 1:2. For example, the ratio of carbonyl groups to reactive amino groups may be in the range of 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2.

Herein, the term "reactive amino group" means any amino group in the nitrogen-containing reactant(s) which is capable of reacting with the carbohydrate component. Specifically, examples of such reactive amino groups include primary and secondary amino groups, amide groups, imine and imide groups, as well as cyanate and isocyanate groups.

The binder composition may include ester and/or polyester compounds. The binder composition may comprise one or more adjuvants, for example waxes, dyes release agents and formaldehyde scavengers (notably urea, tannins, quebracho extract, ammonium phosphate, bisulfite).

The binder composition may be applied to the wood particles, in the form of an aqueous composition, preferably an aqueous solution or dispersion, notably in which the dry weight of the aqueous binder composition makes up: ≥40 wt %, ≥45 wt %, ≥50 wt %, ≥55 wt % or ≥60 wt % and/or ≤95 wt %, ≤90 wt %, ≤85 wt % or ≤80 of the total weight of the aqueous binder composition. The presence of the non-carbohydrate polyhydroxy component(s) is particularly advantageously when the binder composition is used at a high solid content, notably ≥55 wt %, to facilitate even distribution of the binder composition over the resinated wood particles despite the high solid content.

The binder composition, notably in the state in which it is applied to the wood particles may have a viscosity which is: —greater than or equal to: 10 cP, 25 cP, 50 cP, 75 cP or 85 cP or 95 cP or 105 cP or 115 cP or 125 cP; and/or—less than or equal to: 250 cP or 225 cP or 200 cP or 175 cP or 150 cP; notably when the viscosity is measured at 20° C.

The term "wood particle" used herein means wood particles or fibers, including wood chips, wood flakes, sawmill shavings and saw dust or mixtures thereof. The wood particles may have granular sizes of 0.05-10 mm or 1-10 mm. The wood particle board may be a multi-layer wood particle board; in this case, the particles used for the core layer may have granular sizes between 0.05-10 mm or 1-10 mm and the surface layer particles may have a granular size less than 1.5 mm. The aforementioned granular sizes are in respect of at least 90% by weight of the wood particles, preferably at least 95% by weight. Wood particles from both virgin wood and/or reclaimed wood may be used; the wood may comprise, but are not limited to, birch, beech, alder, pine, spruce tropical wood or wood mixtures. Preferably, the wood particles contacted with the binder composition have a moisture content of less than 8%, less than 6% or less than 5% moisture, for example due to pre-drying; they may be pre-dried to a moisture content of 1 to 5% moisture, e.g. 2 to 4% moisture or 1.5 to 3.5% moisture.

The particle boards of the invention may comprise boards commonly called particle boards or oriented strand boards or medium density fiber boards or high density fiber boards.

The wood particle boards, notably once cured, may comprise at least 70%, at least 80%, at least 90% or at least 95% by weight of wood particles.

The wood particle boards, notably once cured, may comprise at least 0.025%, at least 0.05%, at least 0.075% or at least 1% and/or less than 5%, less than 4%, less than 3% or less than 2% of the non-carbohydrate polyhydroxy component(s) by dry weight of the finished particle board. When the particle is a multi-layer board in which the non-carbohydrate polyhydroxy component(s) is not present in all of the layers, the above result may be obtained in respect only of the layer(s) containing the non-carbohydrate polyhydroxy component(s). The quantitative determination of the non-carbohydrate polyhydroxy component(s) may be made by HPLC (high-pressure liquid chromatography) after an extractive process. The extractive process may consist of a sample of the finished particle board broken into a small piece (for example 2 g) and placed into hot water. The sample in the hot water may be sonicated in an ultrasonic bath (for example during 15 minutes) and then the extract may be filtered and introduced to a HPLC column. For quantification of glycerol, or other low molecular weight non-carbohydrate polyhydroxy component, an example of a suitable column may be a Luna NH2 (250 mm*4.6 mm*5 microns) eluted with a mobile phase of 10% water and 90% acetonitrile.

The thickness of the wood particle board may be ≥5 mm, ≥8 mm, ≥10 mm, or ≥15 mm and/or ≤100 mm, ≤80 mm, ≤60 mm, ≤50 mm, ≤45 mm or ≤25 mm Preferred thicknesses are in the range of 10 to 45 mm or 16 to 22 mm. The length of the particle board may be ≥1.5 m, ≥2 m, ≥2.5 m or ≥3 m and/or ≤8 m, ≤6 m or ≤5 m. The width of the particle board may be ≥1 m, ≥1.2 m, ≥1.5 m or ≥1.8 m and/or ≤4 m, ≤3 m or ≤3.5 m.

The wood particle boards may have edges which are trimmed and/or cut and/or machined; they may be piled up and provided as a package comprising a plurality of boards arranged and/or bound together, for example to facilitate transport; the package may comprise an enveloping film, for example of a plastics material.

The binder composition may be applied to the wood particles as a single binder composition, for example by all ingredients of the binder composition being mixed together before being applied as a single spray or projection to the wood particles. Alternatively, two or more portions of the binder composition may be applied separately. For example, the non-carbohydrate polyhydroxy component may be applied to the wood particles separately from the rest of the binder composition. The binder composition may be applied to the wood particles by spraying, for example by passing the wood particles through a spray of the binder composition or by spraying the binder composition over the wood particles whilst the wood particles are being mixed. Preferably, the wood particles are mixed subsequently to application of the binder composition, for example by tumbling, notably in a mixer or bunker. Mixing of the wood particles with the binder composition may comprise applying the binder composition to the wood particles, preferably with subsequent additional mixing of the wood particles, for example by tumbling.

During the curing of the wood particle board, the internal temperature of the board, notably the temperature at the centre of the board in its thickness direction, may be raised to a temperature of: a) ≥100° C., ≥110° C., ≥115° C., ≥120°

C., ≥130° C. or ≥140° C., and/or b) ≤200° C., ≤180° C., ≤170° C. or ≤160° C. The curing temperature may range from 110° C. to 280° C. Further examples of the curing temperature include ranges of 110 to 260° C., to 240° C., to 220° C. or to 210° C.

The mat of resinated particles may be pressed, e.g. in a hot press, at a pressure which is ≥20 bar, ≥25 bar or ≥30 bar and/or ≤80 bar, ≤75 bar, ≤70 bar or ≤65 bar to obtain a cured particle board.

The mat of resinated particles may be pressed at a press factor in second per mm of thickness of the wood particle board which is ≥2 seconds/mm, ≥3 seconds/mm, ≥4 seconds/mm or ≥5 seconds/mm and/or ≤60 seconds/mm, ≤40 seconds/mm, ≤30 seconds/mm or ≤20 seconds/mm to obtain a cured particle board. Thus, the press-time may depend on the thickness of the wood particle board.

Embodiments of the invention will now be described, by way of example only, with reference to the accompanying images of which:

FIG. 1 is a representation of a wood particle board made in accordance with the invention; and FIG. 2 is a representation of a comparative example.

Example 1. Two wood particle boards, samples A1 and A2, of length and width 300×300 mm having a thickness of 16 mm and a target density of 650 kg/m$^3$ were prepared. Once dried to a residual moisture content of about 3.5 wt % (based on oven dried wood weight) the wood particles were sprayed with the binder composition and thoroughly mixed by tumbling: Both wood particleboards were three layer particle boards and were made with Urea Formaldehyde (UF) resinated core chips at a 62:38 ratio of core:surface wood chip mass. The UF was 95.5 parts by weight (66.72 g, 66% solid) of UF resin and 4.5 parts by weight (3.81 g, 52% solid) ammonium nitrate catalyst.

Surface layer binder composition of Sample A1: According to the invention 43.5 parts by weight (19.2 g) of dextrose monohydrate (DMH 90.9 wt % dextrose and 9.1 wt % water of crystallisation), 43.5 parts by weight (17.45 g, 100% solid) of fructose, 13.00 parts by weight (7.45 g, 70 wt % in H$_2$O) of HMDA (hexamethylenediamine, 1,6-hexanediamine) and addition of 5 parts by weight (2.91 g, 69% solid) glycerol. The solid content was 69 wt %.

Surface layer binder composition of Sample A2: Comparative example. 43.5 parts by weight (19.2 g) of dextrose monohydrate (DMH 90.9 wt % dextrose and 9.1 wt % water of crystallisation), 43.5 parts by weight (17.45 g, 100% solid) of fructose, 13.00 parts by weight (7.45 g, 70 wt % in H$_2$O) of HMDA (hexamethylenediamine, 1,6-hexanediamine) The solid content was 69 wt %. A mass of coated wood particles adapted to achieve a target board density of 650 kg/m$^3$ was transferred into a forming box in order to form board samples of 300×300×16 mm. The loading of the binder composition is of 10% on surface chips and 7.5% on core chips. Board samples were pressed under 56 bar, to a thickness of 16 mm using metal stops, at a target platen temperature of 230° C. for a given time period such as to reach a press factors of 7 s per mm thickness for a 16 mm thick board.

Figure 2:
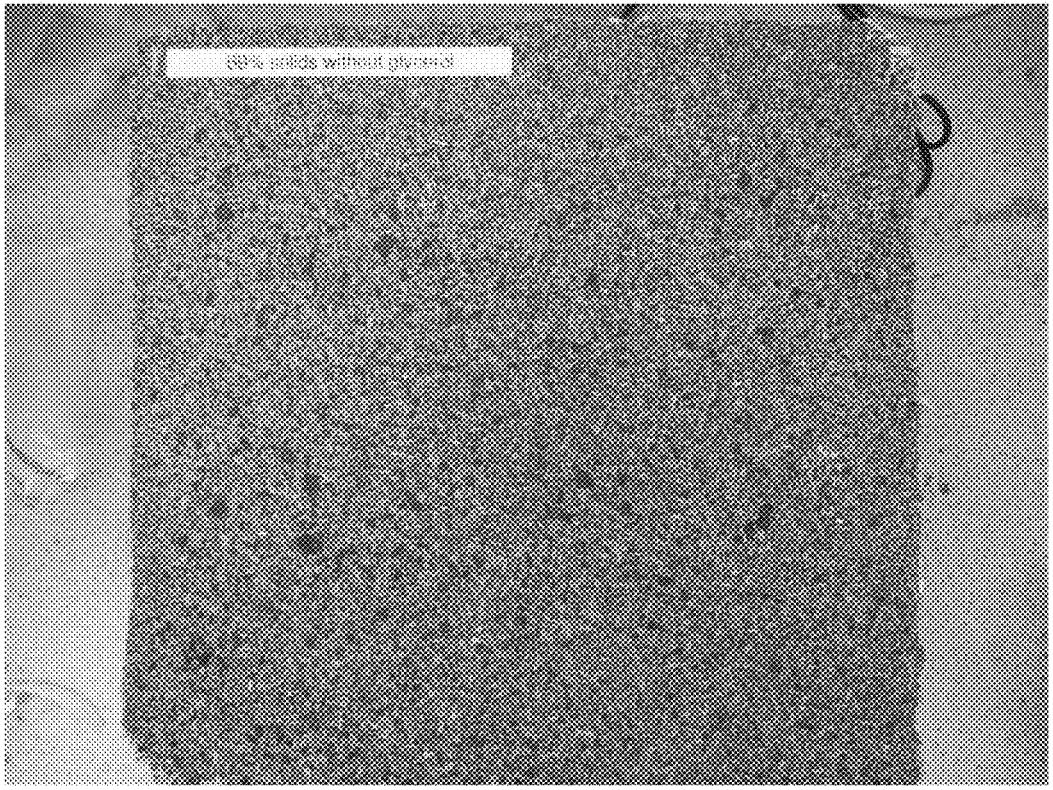
FIG. 2 shows the particle board of sample A2.

The comparative example of Sample A2 in FIG. 2 shows that several spots are clearly visible. These spots are believed to be clumpings of the wood particles with binder due to poor binder distribution. Such clumping can lead to non-homogeneous properties of the wood particle board, notably affecting bond strength and/or breaking resistance.

Figure 1:
FIG. 1 shows the particle board of sample A1.

FIG. 1 shows reduced presence of spots.

The invention claimed is:

1. A method of manufacturing a wood particle board comprising:
    a) mixing wood particles with a binder composition having a dry weight comprising at least 40% by weight (wt. %) of the binder composition to produce resinated wood particles comprising wood particles coated with the binder composition;
    b) forming a resinated mat comprising the resinated wood particles arranged in the form of a mat of loosely arranged resinated wood particles; and
    c) forming a wood particle board by curing the binder composition while subjecting the resinated mat to pressure; wherein the binder composition comprises 0.1-25 wt. % of at least one non-carbohydrate polyhydroxy component for reducing or eliminating resinated wood particle clumping.

2. The method of claim 1, wherein the at least one non-carbohydrate polyhydroxy component is selected from the group consisting of glycerol, a polyalkylene glycol, polyethylene glycol, polypropylene glycol, trimethylolpropane, pentaerythritol, polyvinyl alcohol, partially hydrolyzed polyvinyl acetate, fully hydrolyzed polyvinyl acetate and mixtures thereof.

3. The method of claim 1, wherein the at least one non-carbohydrate polyhydroxy component comprises 1-20 wt. % of the binder composition.

4. The method of claim 1, wherein the at least one non-carbohydrate polyhydroxy component comprises 2-18 wt. % of the binder composition.

5. The method of claim 1, wherein the at least one non-carbohydrate polyhydroxy component comprises 5-10 wt. % of the binder composition.

6. The method of claim 1, wherein the binder composition comprises at least 30% by dry weight of a carbohydrate reactant.

7. The method of claim 1, wherein the binder composition comprises (a) at least one reducing sugar reactant and at least one nitrogen-comprising reactant; and/or (b) at least one curable reaction product of at least one reducing sugar reactant and at least one nitrogen-comprising reactant; wherein the combined weight of (a) and (b) comprises at least 30% by dry weight of the binder composition.

8. The method of claim 7, wherein the at least one reducing sugar reactant is selected from the group consisting of monosaccharides, disaccharides, polysaccharides and combinations thereof.

9. The method of claim 7, wherein the at least one nitrogen-comprising reactant is selected from the group consisting of NH$_3$, an inorganic amine, an organic amine comprising at least one primary amine group, a salt thereof and combinations thereof.

10. The method of claim 7, wherein the at least one nitrogen-comprising reactant comprises a polyamine comprising the general chemical structure H$_2$N-Q-NH$_2$, wherein Q is an alkanediyl selected from the group consisting of a —C$_2$-C$_{24}$- group, a C$_6$-alkanediyl group, a cycloalkanediyl group, a cyclohexanediyl group, a cyclopentanediyl group, a cyclobutanediyl group, a heteroalkanediyl group, a cycloheteroalkanediyl group, chemically substituted variants thereof and combinations thereof.

11. The method of claim 10, wherein the polyamine is selected from a polyether-polyamine, a polymeric polyamine and combinations thereof.

12. The method of claim 10, wherein the polyamine is selected from 1,6-diaminohexane (hexamethylenediamine (HMDA)), 1,5-diamino-2-methylpentane (2-methyl-pentamethylenediamine) and combinations thereof.

13. The method of claim 10, wherein Q comprises a divalent benzyl radical.

14. A wood particle board produced in accordance with the method of claim 1.

15. The wood particle board of claim 14, comprising wood particles held together by a cured, thermoset binder, wherein the wood particle board comprises at least 0.05% of the at least one non-carbohydrate polyhydroxy component by dry weight of the wood particle board.

16. The wood particle board of claim 14, comprising a multilayer wood particle board comprising wood particles held together by a cured, thermoset binder, wherein at least one layer of the wood particle board comprises at least 0.05% of the at least one non-carbohydrate polyhydroxy component by dry weight of the wood particle board.

* * * * *

(12) SUPPLEMENTAL EXAMINATION CERTIFICATE

| United States Patent | (10) Number: | US 11,230,031 F1 |
| --- | --- | --- |
| Hand | (45) Certificate Issued: | May 30, 2024 |

Control No.: 96/050,039    Filing Date: May 9, 2024

Primary Examiner: Norca L. Torres Velazquez

No substantial new question of patentability is raised in the request for supplemental examination. See the Reasons for Substantial New Question of Patentability Determination in the file of this proceeding.

(56) Items of Information

OTHER DOCUMENTS

Declaration of Richard Hand dated November 04, 2020.

Supplemental Declaration of Richard Hand dated October 18, 2023.